(12) United States Patent
Yokoyama et al.

(10) Patent No.: US 9,433,976 B2
(45) Date of Patent: Sep. 6, 2016

(54) PROCESS FOR PRODUCING MULTI-LAYER COATING

(75) Inventors: Ayumu Yokoyama, Wallingford, PA (US); Irving D Bell, West Chester, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 371 days.

(21) Appl. No.: 13/641,732

(22) PCT Filed: May 11, 2011

(86) PCT No.: PCT/US2011/036002
§ 371 (c)(1),
(2), (4) Date: Oct. 17, 2012

(87) PCT Pub. No.: WO2011/146277
PCT Pub. Date: Nov. 17, 2011

(65) Prior Publication Data
US 2013/0040149 A1 Feb. 14, 2013

Related U.S. Application Data

(60) Provisional application No. 61/333,396, filed on May 11, 2010.

(51) Int. Cl.
*B05D 5/02* (2006.01)
*B05D 7/14* (2006.01)
*B05D 7/16* (2006.01)
*B05D 7/00* (2006.01)
*C09D 7/00* (2006.01)
*C09D 7/12* (2006.01)

(52) U.S. Cl.
CPC ............... *B05D 7/542* (2013.01); *B05D 5/02* (2013.01); *B05D 7/14* (2013.01); *B05D 7/16* (2013.01); *B05D 7/532* (2013.01); *C09D 7/005* (2013.01); *C09D 7/1283* (2013.01); *B05D 7/54* (2013.01); *Y10T 428/31554* (2015.04)

(58) Field of Classification Search
None
See application file for complete search history.

(56) References Cited

U.S. PATENT DOCUMENTS 6,649,688 B1 * 11/2003 Mayer et al. ............... 524/558
2002/0052451 A1    5/2002 Vandevoorde et al.
2003/0091833 A1 *  5/2003 Baumgart et al. ......... 428/423.1
2006/0222875 A1 * 10/2006 Sormani et al. ............ 428/500
2007/0088102 A1 *  4/2007 Knouse ....................... 523/451

OTHER PUBLICATIONS

ISA USPTO, International Search Report and Written Opinion for International Application No. PCT/US2011/036002, dated Aug. 5, 2011.

* cited by examiner

*Primary Examiner* — William Phillip Fletcher, III
(74) *Attorney, Agent, or Firm* — Lorenz & Kopf LLP

(57) ABSTRACT

This disclosure is directed to a process for producing a target coating having two or more coating layers over a substrate. The disclosure is also directed to a primer coating composition comprising a topcoat component and one or more flatteners. This disclosure is further directed to a multi-layer coating formed by the process disclosed herein.

18 Claims, No Drawings

PROCESS FOR PRODUCING MULTI-LAYER COATING

CROSS-REFERENCE TO RELATED APPLICATIONS

This application is a U.S. National-Stage entry under 35 U.S.C. §371 based on International Application No. PCT/US2011/036002, filed May 11, 2011, which was published under PCT Article 21(2) and which claims priority to U.S. Provisional Application No. 61/333,396, filed May 11, 2010, which are all hereby incorporated in their entirety by reference.

FIELD OF DISCLOSURE

The present disclosure is directed to a process for producing a target coating having two or more coating layers over a substrate. The disclosure is also directed to a primer coating composition comprising a topcoat component and one or more flatteners.

BACKGROUND OF DISCLOSURE

A typical coating over a substrate can comprise some or all of the following layers: (1) one or more primer layers, (2) one or more colored layers, and (3) one or more clearcoat layers. A primer layer is typically an initial coating layer over a substrate that can provide adhesion and basic protection, such as corrosion protection. The primer layer can be formed from a primer coating composition. A colored layer formed from a colorcoat coating composition having pigments and applied over the primer layer can provide most of the protection, durability and color. A clearcoat layers formed from a clearcoat coating composition and applied over the colored layer can provide additional durability and improved appearance. A topcoat layer can be used in place of the colored layer and the clearcoat layer. The topcoat layer can provide desired color, appearance such as gloss, perception of depths, sparkle, or a combination thereof.

Currently, a primer coating composition is different from a topcoat coating composition.

STATEMENT OF DISCLOSURE

This disclosure is directed to a process for producing a target coating having two or more coating layers over a substrate and having a range of target gloss value, said process comprising the steps of:
a) selecting a topcoat component based on said range of target gloss value;
b) providing a first coating composition comprising said topcoat component and a first flattener component;
c) applying said first coating composition over said substrate to form a first coating layer thereon;
d) providing a second coating composition comprising said topcoat component; and
e) applying said second coating composition over said first coating layer to form a second coating layer thereon.

This disclosure is also directed to a primer coating composition comprising a topcoat component and flattener component comprising one or more flatteners.

This disclosure is also directed to a multi-layer coating having two or more coating layers over a substrate, said multi-layer coating comprising:
i) a primer layer over said substrate, said primer layer is formed from a first coating composition comprising a topcoat component and a flattener component; and
ii) a topcoat layer over said primer layer, said topcoat layer is formed from a second coating composition comprising said topcoat component.

This disclosure is further directed to a primer coating composition comprising a topcoat component and flattener component comprising one or more flatteners.

DETAILED DESCRIPTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

The term "coating composition" can include any coating compositions known to or developed by those skilled in the art and can include a two-pack coating composition, also known as "2K coating composition"; a one-pack or 1K coating composition; a chemical curable coating composition having a crosslinkable component and a crosslinking component; a radiation curable coating composition, such as a UV curable coating composition or an E-beam curable coating composition; a mono-cure coating composition that can be cured by one mechanism, such as chemical curing or radiation curing; a dual-cure coating composition that can be cured by two curing mechanisms, such as both chemical curing and radiation curing; a lacquer coating composition; a waterborne coating composition or aqueous coating composition; a solvent borne coating composition; or any other coating compositions known to or developed by those skilled in the art. The coating composition can be formulated as a primer, a basecoat, or a color coat composition and can comprise dyes, pigments or effect pigments. The coating composition can also be formulated as a clearcoat composition. Clearcoat composition can further comprise certain pigments having same or similar optical properties, such as same or similar refractive index as the cured clearcoat. A coating composition can comprise one or more volatile organic compounds (VOCs).

The term "vehicle", "automotive", "automobile" or "automotive vehicle" can include an automobile, such as car, bus, truck, semi truck, pickup truck, SUV (Sports Utility Vehicle); tractor; motorcycle; trailer; ATV (all terrain vehicle); heavy duty mover, such as, bulldozer, mobile crane and earth mover; airplanes; boats; ships; and other modes of transport.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The time it takes for the viscosity of the pot mix to increase to such point where spraying becomes ineffective, generally a two-fold increase in viscosity, is referred to as "pot life". The pot mix can be applied as a layer of a desired thickness on a substrate. After application, the layer dries and cures at ambient or at elevated temperatures to form a coating layer having desired coating properties, such as, adhesion, high gloss, mar-resistance and resistance to environmental etching.

The term "crosslinkable component" refers to a component having "crosslinkable functional groups" that are functional groups positioned in molecules of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during a curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acid or polyacid, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The crosslinkable component can comprise acrylic polymers, polyesters, or a combination thereof. The crosslinkable component can have one or more aforementioned crosslinkable functional groups. The acrylic polymers or the polyesters can be linear or branched and can have one or more aforementioned crosslinkable functional groups.

The term "crosslinking component" refers to a component having "crosslinking functional groups" that are functional groups positioned in molecules of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acid or polyacid, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include isocyanate, thioisocyanate and melamine functional groups each crosslinking with hydroxyl, thiol, primary and secondary amine, ketimine, or aldimine functional groups.

This disclosure is directed to a process for producing a target coating having two or more coating layers over a substrate and having a range of target gloss value. The process can comprise the steps of:

a) selecting a topcoat component based on said range of target gloss value;

b) providing a first coating composition comprising said topcoat component and a first flattener component;

c) applying said first coating composition over said substrate to form a first coating layer thereon;

d) providing a second coating composition comprising said topcoat component; and e) applying said second coating composition over said first coating layer to form a second coating layer thereon.

The process can further comprise the step of curing the first coating layer and the second coating layer to form the target coating having a gloss value within said range of target gloss value. The coating layers can be cured at the same time or independently at ambient temperatures or at elevated temperatures. The term "ambient temperature" used herein refers to temperatures in a range of from 15° C. to 50° C. The term "elevated temperature" used herein refers to temperatures in a range of from 50° C. to 350° C. In one example, the topcoat component can comprise a hydroxyl crosslinkable component and isocyanate crosslinking component and be cured at ambient temperatures. In another example, the topcoat component can comprise UV curable double bonds and be cured with UV irradiation. In yet another example, the topcoat can be a lacquer coating composition and be cured at ambient temperatures or elevated temperatures.

The first coating layer can be a primer layer. The second coating layer can be a topcoat layer. The second coating layer can be the out-most coating layer on the substrate. The target coating can be free from a clearcoat layer.

The substrate can be a vehicle body, vehicle body part, or a combination thereof.

The second coating composition can be applied over the first coating layer wet-on-wet. The term "wet-on-wet" means that the second coating composition is applied over the first coating layer before the first coating layer is completely dried or cured.

The second coating composition can further comprise a second flattener component being the same or different from said first flattener component. The second flattener can be used to modulate the gloss of the second coating layer. In one example, the first and the second flatteners can be the same type, but in different amounts. In another example, the first and the second flatteners can be the same type and in same amounts. In yet another example, the first and the second flatteners can be different types and in different amounts. In further example, the first and the second flatteners can be different types, but in same amounts.

The first or the second coating composition can comprise one or more pigments. Any pigments suitable for use in coating compositions can be used. Examples of pigments can include organic or inorganic pigments, effect pigment such as metallic pigments, metallic flakes, pearlescent pigments, and any other pigments known to or developed by those skilled in the art. The pigments can also include earth elements such as rare elements. Any combinations of the pigments can also be suitable. In one example, the first and the second coating composition can comprise the same types of pigments and in same amounts. In another example, the first and the second coating composition can comprise the same types of pigments and in different amounts. In yet another example, the first and the second coating composition can comprise different types of pigments and in same amounts. In further example, the first and the second coating composition can comprise different types of pigments and in different amounts. The amount of each pigment in a coating composition can be expressed as a weight percentage based on the weight of the coating composition. The amount of each pigment in a coating composition can also be expressed as a volume percentage based on the volume of the coating composition.

The term "flattener" or "flattener component" refers to a composition that can be used to reduce or control gloss or matting of coatings. A flattener can comprise organic or inorganic particles, such as silica particles. The particles can have an average particle size in a range of from 2 to 20 micrometers (μm). The particles can have one or more surface treatments. In one example, the particles can be organic surface treated silica particles. In another example, particles can be untreated silica particles. In yet another example, the particles can be thermally treated silica particles. Silica particles can have hydrophobic or hydrophilic surface property. Flatteners comprising commercial available silica particles, such as those available under the trademark ACEMATT® from Degussa Evonik under respective registered trademark, can be suitable. Silica particles that have organic surface-treatment, such as ACEMATT® OK 412 under respective trademark can also be suitable. Commercial available flatteners, such as Imron® Industrial Strength 9T20™ Flattener available from DuPont, Wilmington, USA, under respective registered or unregistered trademarks, can also be suitable. The flattener is typically formulated to be compatible to the coating composition that it is intended to provide matting. For example, for a solvent borne coating composition, the flattener is typically also formulated in similar solvent or solvent mix compatible with the solvent borne coating composition.

The flattener can further comprise polytrimethylene ether diol. Suitable polytrimethylene ether diol can have a number average molecular weight (Mn) in the range of from 500 to 10,000, preferably 500 to 8,000, even preferably 500 to 4,000. The polytrimethylene ether diol can have a Tg of about −75° C., a polydispersity in the range of from 1.1 to 2.1 and a hydroxyl number in the range of from 20 to 200. Suitable polytrimethylene ether diol can be prepared by an acid-catalyzed polycondensation of 1,3-propanediol, such as described in U.S. Pat. Nos. 6,977,291 and 6,720,459. A bio-route via fermentation of a renewable resource can be used to obtain the 1,3-propanediol. One example of renewable resources is corn since it is readily available and has a high rate of conversion to 1,3-propanediol and can be genetically modified to improve yields to the 1,3-propanediol. Examples of typical bio-route can include those described in U.S. Pat. Nos. 5,686,276, 5,633,362 and 5,821,092.

The flattener can comprise one or more solvents if so desired. Any typical organic solvents commonly used in coating industry can be suitable for this invention. Examples of solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof. Some commercial available solvents, such as Oxsol® 100 available from MANA, New York, N.Y., USA, under respective registered trademark, can also be used.

The first or said second flattener component comprises silica particles. In one example, the first flattener component comprises silica particles having an average particle size in a range of from 2 to 20 micrometers (μm). In another example the second flattener component comprises silica particles having an average particle size in a range of from 2 to 20 micrometers (μm). In yet another example, both the first and the second flattener components comprise silica particles having an average particle size in a range of from 2 to 20 micrometers (μm).

The process can further comprise the step of curing said first coating layer before applying said second coating composition thereon. The first coating layer can be cured at ambient temperatures or elevated temperatures. When cured, a gloss value of the first coating layer can be measured. The gloss value of the cured first coating layer can be less than the gloss value of the target coating.

The process can further comprising the step of sanding said first coating layer before applying said second coating composition thereon. Typically, sanding can remove minor defects such as unevenness of the first coating layer. Sanding can also improve adhesion between the first coating layer and coating layers applied thereon.

The topcoat component can be selected from a chemical curable coating composition, a radiation curable coating composition, or a lacquer coating composition. The topcoat component can also be selected from a one-pack coating composition or a two pack-coating composition. The topcoat component can further be selected from a mono-cure coating composition or a dual-cure coating composition. The topcoat component can yet be selected from a waterborne coating composition or a solvent borne coating composition.

The target coating can have a target range of gloss value in a range of from "flat" to "high gloss" using descriptive gloss values. In one example, the target range of gloss value can be "flat". In another example, the target range of gloss value can be "satin". In yet another example, the target range of gloss value can be "semi". In further another example, the target range of gloss value can be "high gloss". The target coating can have a target range of gloss value in a range of from 0°-100° at a certain angle using numeric gloss values. In a further example, the target range of gloss value can be in a range of from 0°-10° at 60° angle. In an even further example, the target range of gloss value can be in a range of from 10°-45° at 60° angle. In yet a further example, the target range of gloss value can be in a range of from 45°-65° at 60° angle. In yet a further example, the target range of gloss value can be in a range of from 65°-100° at 60° angle. The descriptive gloss values and the numeric gloss values can be correlated. For example, a flat gloss value can be correlated to 0°-10° at 60° angle, a satin gloss value can be correlated to 10°-45° at 60° angle, a semi gloss value can be correlated to 45°-65° at 60° angle, and a high gloss can be correlated to 65°-100° at 60° angle. Other correlations among the descriptive gloss values and numeric gloss values can also be suitable.

The coating composition of this disclosure, either the first coating composition or the second coating composition, or both the first coating composition and the second coating composition, can further comprise one or more catalysts to reduce curing time and to allow curing of the coating composition at ambient temperatures. The ambient temperatures are typically referred to as temperatures in a range of from 18° C. to 35° C. Typical catalysts can include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof.

The coating composition of this disclosure, either the first coating composition or the second coating composition, or both the first coating composition and the second coating composition, can comprise one or more solvents. Typically the coating composition can comprise up to 95% by weight, based on the weight of the coating composition, of one or more solvents. Typically, the coating composition of this disclosure can have a solid content in a range of from 20% to 80% by weight in one example, in a range of from 50% to 80% by weight in another example and in a range of from 60% to 80% by weight in yet another example, all based on the total weight of the coating composition. The coating composition of this disclosure can also be formulated at 100% solids by using a low molecular weight acrylic resin reactive diluent.

The coating composition of this disclosure, either the first coating composition or the second coating composition, or both the first coating composition and the second coating composition, can comprise in a range of from 10% to 90% in one example, 10% to 80% in another example, 10% to 70% in yet another example, 10% to 60% in yet another example, 10% to 50% in further another example, of water, as a solvent based on the weight of the coating composition.

The coating composition of this disclosure can comprise organic solvents. Any typical organic solvents can be used to form the coating composition of this disclosure. Examples of solvents include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

The coating composition of this disclosure can comprise one or more pigments. Conventional inorganic and organic colored pigments, metallic flakes and powders, such as, aluminum flake and aluminum powders; special effects pigments, such as, coated mica flakes, coated aluminum flakes colored pigments, a combination thereof can be used. Transparent pigments or pigments having the same refractive index as the cured binder can also be used.

The coating composition of this disclosure can also comprise one or more ultraviolet light stabilizers in the amount of 0.1% to 10% by weight, based on the weight of the binder. Examples of such ultraviolet light stabilizers can include ultraviolet light absorbers, screeners, quenchers, and hindered amine light stabilizers. An antioxidant can also be added to the coating composition, in the amount of about 0.1% to 5% by weight, based on the weight of the coating composition.

The coating composition of this disclosure can further comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered tradmarks, leveling agents based on (meth)acrylic homopolymers; rheological control agents, such as highly disperse silica, fumed silica or polymeric urea compounds; thickeners, such as partially crosslinked polycarboxylic acid or polyurethanes; antifoaming agents; catalysts for the crosslinking reaction of the OH-functional binders, for example, organic metal salts, such as, dibutyltin dilaurate, zinc naphthenate and compounds containing tertiary amino groups, such as, triethylamine, for the crosslinking reaction with polyisocyanates. The additives are used in conventional amounts familiar to those skilled in the art.

The coating composition of this disclosure can be applied using coating application techniques such as spraying, brushing, rolling, draw down, or any other coating application techniques known to or developed by those skilled in the art. The coating layer can be cured or dried to form a dry coating layer at room temperatures, also known as ambient temperatures, such as a temperature in a range of from 15° C. to 50° C., or at elevated temperatures, such as a temperature in a range of from 50° C. to 300° C.

This disclosure can also be directed to a method for producing a primer layer and a topcoat layer of a target coating over a substrate. The method can comprise the steps of:
(1) providing a first coating composition comprising a topcoat component and a flattener component;
(2) applying said first coating composition over said substrate to form said primer layer thereon;
(3) providing a second coating composition comprising said topcoat component; and
(4) applying said second coating composition over said primer layer to form said topcoat layer thereon.

The method can further comprise the step of curing the primer layer and the topcoat layer to form the target coating. The method can provide improved adhesion to the substrate. The method can also improve adhesion between the primer and the topcoat layers.

This disclosure is also direct to a primer coating composition comprising a topcoat component and flattener component comprising one or more flatteners.

This disclosure is also direct to a multi-layer coating having two or more coating layers over a substrate. The multi-layer coating can comprise:
i) a primer layer over said substrate, said primer layer is formed from a first coating composition comprising a topcoat component and a flattener component; and
ii) a topcoat layer over said primer layer, said topcoat layer is formed from a second coating composition comprising said topcoat component.

The first coating composition or the second coating composition can comprise one or more pigments.

Testing Procedures

Adhesion Test—The cross hatch tape test is primarily intended for use in the laboratory. A cross-hatch pattern is created using a special cross-hatch cutter with multiple preset blades can be used to make parallel incisions with proper space. After the tape has been applied and pulled off, the cut area is inspected and rated. The foregoing test is based on a standard method for the application and performance of these adhesion tests available in ASTM D3359 B. Adhesion can be rated on a sliding scale, which ranges from 0B (no adhesion, i.e., total failure) to 5B (complete adhesion, i.e., total success). A rating of 3B and higher is preferable and a rating of 4B and higher is more preferable. A device described in U.S. Pat. No. 7,263,777 can be used to create properly spaced and parallel incisions into the coating.

Dry time—Dry to touch time is determined by ASTM D1640.

Orange Peel—WAVE-SCAN DOI Meter from Byk Instruments, Columbia, Md., USA, was used to measure orange peel. Orange peel was rated on a rating scale from 0 to 10 with 0 being the worst and 10 being the best with no orange peel.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Coating compositions were prepared according to Table 1. The first coating composition was applied over a Cold Roll Steel panel with Bonderite®1000, available from ACT Panels, Hillsdale, Mich. 49242, USA. The first coating composition was applied with a GTI Spray Gun available from DeVilbiss, Pittsburgh, Pa. 15234, USA, with a 1.4 fluid nozzle and 2000 Air Cap. The second coating composition was applied over the first coating layer while it was still wet. The first and the second coating layers were cured together at 70° F. (about 21° C.) for 24 hours. Coating properties were measured and shown in Table 2.

TABLE 1

Coating Compositions (in volume parts).

|  | Comparative Example | Example |
|---|---|---|
| First coating composition | | |
| Primer component part 1 [a] | 8 | — |
| Primer component part 2 [a] | 1 | — |
| Topcoat component part 1 [b] | — | 6 |
| Topcoat component part 2 [b] | — | 2.5 |
| Flattener component [c] | — | 4 |
| Second coating composition | | |
| Topcoat component part 1 [b] | 2 | 2 |
| Topcoat component part 2 [b] | 1 | 1 |

Note:
[a] The primer component had two parts mixed immediately prior to coating application. The primer component part 1 used was a white polyurethane primer base Imron® Industrial Strength Low VOC Polyurethane Primer 9P01 ™, available from DuPont, Wilmington, USA. The primer component part 2 used was a Imron® 9T00A ™ Activator, available from DuPont, Wilmington, USA, under respective trademarks and registered trademarks. The mixing volume ratio was shown in Table 1 as recommended by the manufacturer.
[b] The topcoat component had two parts mixed immediately prior to coating application. The topcoat component part 1 used was a white polyurethane enamel available as EcoMax ™ TU09 ™ from DuPont, Wilmington, USA, under respective trademarks and registered trademarks. The topcoat component part 2 used was a TU09AS ™ Activator, also available from DuPont, Wilmington, USA, under respective trademark. The mixing volume ratio was shown in Table 1 as recommended by the manufacturer.
[c] The flattener used was 9T20 ™ Flattener available from DuPont, Wilmington, USA, under respective trademark.

TABLE 2

Coating Properties.

|  | Comparative Example | Example |
|---|---|---|
| Orange Peel | 3 | 8 |
| Adhesion | 4A | 5A |

What is claimed is:

1. A process for producing a target coating having two or more coating layers over a substrate and having a range of target gloss value, said process comprising the steps of:
   a) selecting a topcoat component based on said range of target gloss value;
   b) providing a first coating composition comprising said topcoat component and a first flattener component;
   c) applying said first coating composition over said substrate to form a first coating layer thereon;
   d) providing a second coating composition comprising said topcoat component, wherein said second coating composition is different in composition from said first coating composition in that said first coating composition comprises at least one additional component not present in said second coating composition, wherein said at least one additional component is selected from the group consisting of: catalysts and solvents; and
   e) applying said second coating composition over said first coating layer to form a second coating layer thereon.

2. The process of claim 1 further comprising the step of curing said first coating layer and said second coating layer to form said target coating having a gloss value within said range of target gloss value.

3. The process of claim 1, wherein said first coating layer is a primer layer, said primer layer further comprising a polyurethane primer base mixed with a primer activator.

4. The process of claim 3, wherein said second coating layer is a topcoat layer, and wherein said topcoat component comprises a polyurethane enamel mixed with a topcoat activator.

5. The process of claim 4, wherein said target coating is free from a clearcoat layer.

6. The process of claim 4, wherein said second coating composition further comprises a second flattener component being different from said first flattener component.

7. The process of claim 1, wherein said substrate is a vehicle body, vehicle body part, or a combination thereof.

8. The process of claim 1, wherein said second coating composition is applied over said first coating layer wet-on-wet.

9. The process of claim 1, wherein said second coating composition further comprises a second flattener component being different from said first flattener component.

10. The process of claim 9, wherein said first flattener component or said second flattener component comprises silica particles have an average particle size in a range of from 2 to 20 micrometers (μm).

11. The process of claim 10, wherein said first flattener component or said second flattener further comprises polytrimethylene ether diol.

12. The process of claim 1, wherein said first or said second coating composition comprises a pigment.

13. The process of claim 1 further comprising the step of curing said first coating layer before applying said second coating composition thereon.

14. The process of claim 1, wherein said topcoat component is selected from a chemical curable coating composition, a radiation curable coating composition, or a lacquer coating composition.

15. The process of claim 1, wherein said topcoat component is selected from a one-pack coating composition or a two pack-coating composition.

16. The process of claim 1, wherein said topcoat component is selected from a mono-cure coating composition or a dual-cure coating composition.

17. The process of claim 1, wherein said topcoat component is selected from a waterborne coating composition or a solvent borne coating composition.

18. A process for producing a target coating having two or more coating layers over a substrate and having a range of target gloss value, said process comprising the steps of:

a) selecting a topcoat component based on said range of target gloss value;

b) providing a first coating composition comprising said topcoat component and a first flattener component;

c) applying said first coating composition over said substrate to form a first coating layer thereon;

d) providing a second coating composition comprising said topcoat component, wherein said second coating composition is different in composition from said first coating composition in that said first coating composition comprises at least one additional component not present in said second coating composition, wherein said at least one additional component is selected from the group consisting of: catalysts, solvents, pigments, UV stabilizers, wetting agents, leveling and flow control agents, rheological control agents, thickeners, and antifoaming agents; and e) applying said second coating composition over said first coating layer to form a second coating layer thereon.

* * * * *